United States Patent [19]

Hench et al.

[11] Patent Number: 5,147,829

[45] Date of Patent: * Sep. 15, 1992

[54] SOL-GEL DERIVED SIO₂/OXIDE POWDER COMPOSITIES AND THEIR PRODUCTION

[75] Inventors: Larry L. Hench, Gainesville, Fla.; Soon C. Park, Round Rock, Tex.

[73] Assignee: University of Florida Research Foundation, Gainesville, Fla.

[*] Notice: The portion of the term of this patent subsequent to Jul. 25, 2006 has been disclaimed.

[21] Appl. No.: 342,697

[22] Filed: Apr. 19, 1989

[51] Int. Cl.⁵ .......................... B01J 13/00; C03C 3/06
[52] U.S. Cl. ................................. 501/12; 252/315.01; 252/315.5; 252/315.6; 252/315.7; 264/42; 428/328
[58] Field of Search ............ 252/315.01, 315.5, 315.6, 252/315.7; 106/482, 483; 501/12; 264/42; 428/328, 408

[56] References Cited

U.S. PATENT DOCUMENTS

| | | | |
|---|---|---|---|
| 2,281,810 | 5/1942 | Stone et al. | 252/315.6 X |
| 3,594,205 | 7/1971 | Gulledge et al. | 106/444 |
| 3,758,317 | 9/1973 | Moore, Jr. et al. | 501/128 X |
| 3,847,583 | 11/1974 | Dislich et al. | 501/12 X |
| 4,242,251 | 12/1980 | Aishima et al. | 428/404 X |
| 4,323,381 | 4/1982 | Matsuyama et al. | 501/12 X |
| 4,851,150 | 7/1989 | Hench et al. | 252/315.6 |

FOREIGN PATENT DOCUMENTS 0017399 2/1977 Japan ................... 106/444

*Primary Examiner*—Richard D. Lovering
*Attorney, Agent, or Firm*—Finnegan, Henderson, Farabow, Garrett & Dunner

[57] ABSTRACT

A $SiO_2$/oxide powder composite made by preparing a sol containing $SiO_2$ and optionally $Al_2O_3$, $Li_2O$, $Na_2O$, $TiO_2$, $B_2O_3$ and mixtures thereof with oxide powder consisting of $SiO_2$, $Al_2O_3$, $ZrO_2$, $TiO_2$, $Li_2O$-$TiO_2$, $Li_2O$-$Al_2O_3$-$TiO_2$, $\beta$ spodumene crystals, $\beta$ eucryptite crystals, aluminum titanate, 68 $SiO_2$-21.4 $Al_2O_3$-5.7 $TiO_2$-3.8 $Li_2O$ (mole %) and mixtures thereof having a size from about 10 microns to about 0.001 micron dispersed therein, gelling the sol to produce a monolithic $SiO_2$ gel matrix having homogeneously distributed therein the oxide powder, and drying the monolithic $SiO_2$ gel/oxide powder composite.

19 Claims, 6 Drawing Sheets

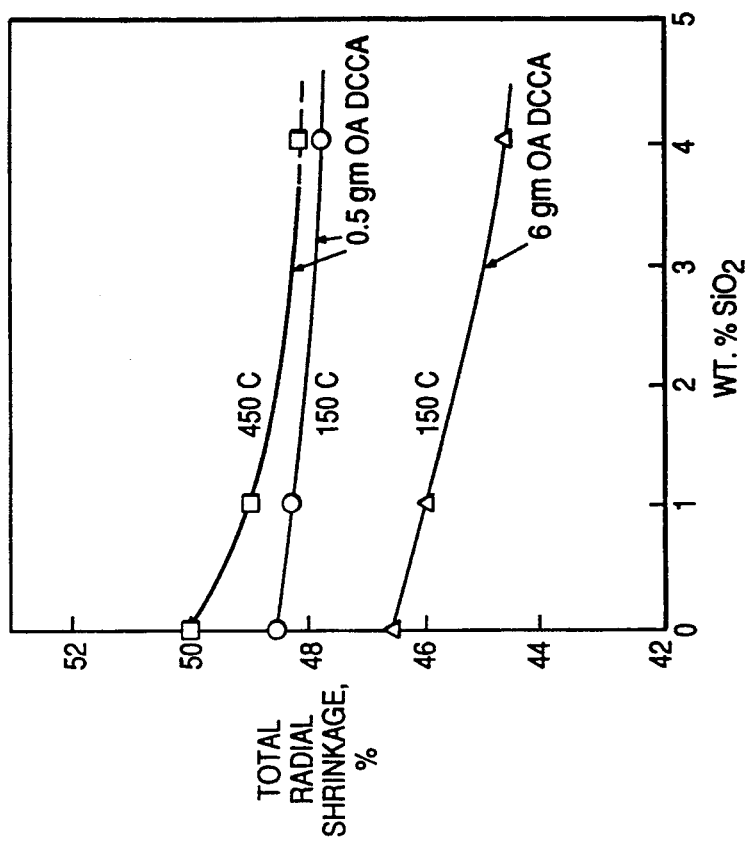
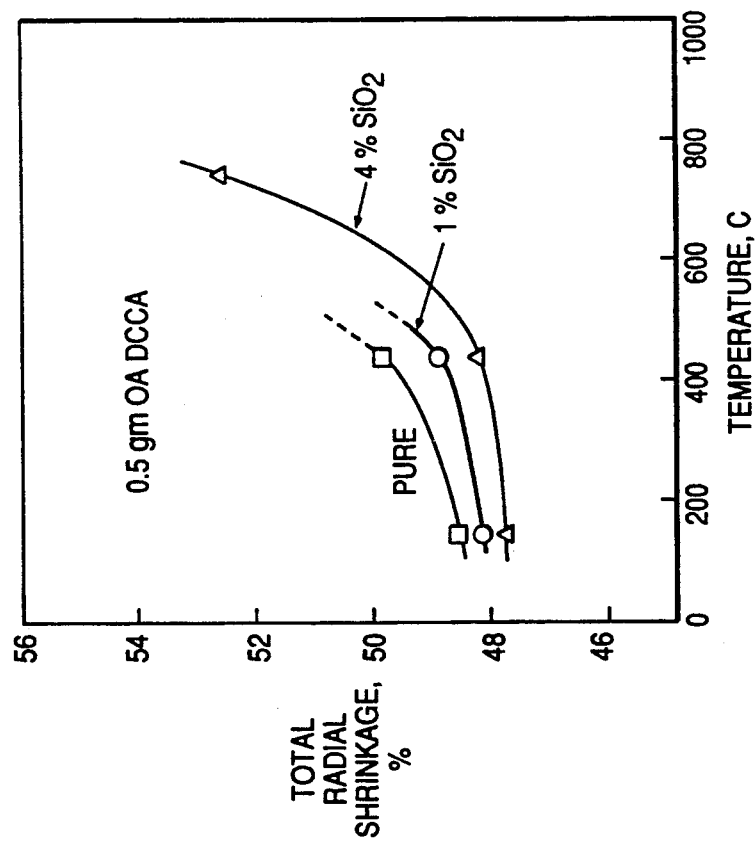

SOL-GEL DERIVED SIO$_2$/OXIDE POWDER COMPOSITES AND THEIR PRODUCTION

This invention was made with Government support under F49620-83-C-0072 awarded by the Air Force. The Government has certain rights in this invention.

This application is a continuation of application Ser. No. 704,969, filed Feb. 25, 1985 and now abandoned.

BACKGROUND OF THE INVENTION

1. Field of the Invention

The present invention relates to a novel method for producing sol-gel derived SiO$_2$/oxide powder composites and novel composites and especially relates to novel composites that exhibit a thermal expansion coefficient of $0 \times 10^{-7}$(°C.$^{-1}$) over a very large temperature range.

2. Description of the Prior Art

Prior developments have described the use of drying control chemical additives for making large sol-gel derived Si containing monoliths, see copending application Ser. Nos. 583,741; 583,742; and 583,744, filed Feb. 27, 1984, all of which are now abandoned. The present invention is an extension of the earlier work described in these copending applications and provides a way to homogeneously disperse oxide powders within a silica gel monolithic matrix.

SUMMARY OF THE INVENTION

The present invention provides sol-gel derived SiO$_2$ containing monoliths which are crack free and contain variable percentages of oxide powders thereby comprising a composite structure. The use of specific drying control chemical additives during the mixing phase of the sol combined with specific procedures for dispersing the oxide powders make possible the production of large scale, fully dried, crack-free, monolithic gel composites routinely and rapidly. The physical properties of the gel derived composites are unique combinations of the properties of the gel matrix and the oxide powder filler.

BRIEF DESCRIPTION OF THE DRAWING

In the drawing, FIGS. 1–9 are graphs showing the results of specific examples of the present invention as described hereinafter.

FIG. 1 shows the variation of density with temperature for SiO$_2$/SiO$_2$ composite with 1 wt.% SiO$_2$ powder;

FIG. 2 shows the variation of density with temperature for SiO$_2$/SiO$_2$ composite with 4 wt.% SiO$_2$ powder;

FIG. 3 shows the effect of amounts of SiO$_2$ powder on the plot of density vs. temperature, using 0.5 gm. oxalic acid DCCA;

FIG. 4 shows the effect of amounts of SiO$_2$ powder on the plot of density vs. temperature, using 6 gm. oxalic acid DCCA;

FIG. 5 shows the effect of amounts of SiO$_2$ powder on the plot of total radial shrinkage vs. temperature, using 0.5 gm. oxalic acid DCCA;

FIG. 6 shows a plot of total radial shrinkage as a function of amounts of SiO$_2$ powder in SiO$_2$/SiO$_2$ composite, and also shows the effect of oxalic acid;

FIG. 7 shows a relationship between total radial shrinkage and density in SiO$_2$/SiO$_2$ composite samples with different amounts of SiO$_2$ powders;

FIG. 8 shows the effect of amounts of SiO$_2$ powder in SiO$_2$/SiO$_2$ composites on mechanical properties, using 0.5 gm. oxalic acid DCCA; and FIG. 9 shows the effect of amounts of SiO$_2$ powder in SiO$_2$/SiO$_2$ composites on mechanical properties, using 6 gm. oxalic acid DCCA.

DETAILED DESCRIPTION OF THE PREFERRED EMBODIMENTS

Figure 2:
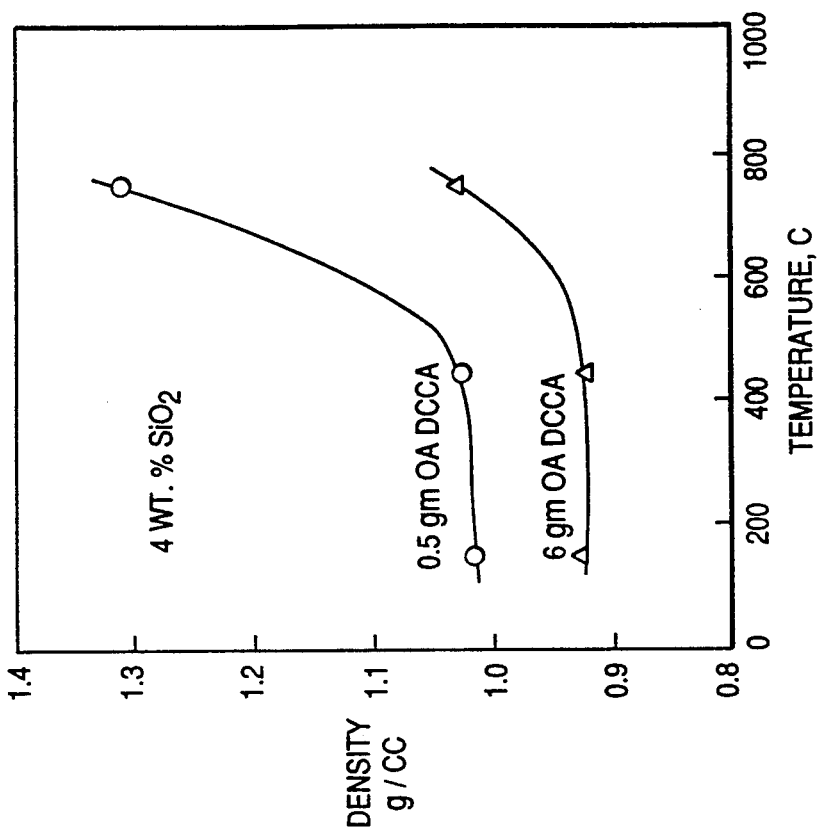

The method of the present invention contemplates incorporating an oxide powder into a SiO$_2$ containing gel. The gel may also contain one or more of the following constituents, in combination with the SiO$_2$, as the matrix material, Al$_2$O$_3$, Li$_2$O, Na$_2$O, TiO$_2$ and B$_2$O$_3$. The second phase material can be an oxide or combination of oxides in particulate form of a size ranging from about 10 microns to about 0.001 micron. The second phase is preferably of submicron size, that is, less than 1 micron, and is homogeneously distributed throughout the matrix. Second phase materials include SiO$_2$, Al$_2$O$_3$, ZrO$_2$, TiO$_2$, Li$_2$O-TiO$_2$, Al$_2$O$_3$-TiO$_2$, spodumene crystals (Li$_2$O Al$_2$O$_3$ 4 SiO$_2$), eucryptite crystals (Li$_2$O Al$_2$O$_3$ 2 SiO$_2$), aluminum titanate (Al$_2$O$_3$ TiO$_2$), 68 SiO$_2$ 21.4 Al$_2$O$_3$ 5,7 TiO$_2$ 3,8 Li$_2$O (mole%), and mixtures of these materials.

The advantages of SiO$_2$ gel monolithic composites containing Al$_2$O$_3$, ZrO$_2$, or TiO$_2$ for example are controlled variations in elastic modulus, stiffness, and damping capacity without a substantial increase in density. The advantage offered by silica gel monolithic composites containing ® spodumene, eucryptite, or aluminum titanate crystals is the ability to produce a wide range of thermal expansion coefficients ranging from $-20 \times 10^{-7}$ (°C.$^{-1}$) to $+100 \times 10^{-7}$ (°C.$^{-1}$) including $0 \times 10^{-7}$ (°C.$^{-1}$).

One of the commercial uses for the novel products of the invention is the use as commercial ultralightweight zero expansion coefficient optical and structural components for large scale space structures and optical systems exposed to high intensity thermal pulses, such as laser beams.

SPECIFIC EXAMPLES

SiO$_2$ powder has homogeneously distributed in metal organic derived sol-gel silica monoliths in order to produce monolithic SiO$_2$/SiO$_2$ composites. The procedure used was the following:

The SiO$_2$ powders used were obtained from Cabot Corporation, known as Cab-O-Sil grade S-17, with a nominal particle size of 0.007 um. A predetermined amount of SiO$_2$ powder (from about 0.1 to about 35% by weight) was first added into the solution mixture with an amount of water and oxalic acid (OA), an organic acid drying control chemical additive. The addition of a drying control chemical additive ("DCCA") permits the controlled evaporation of liquid contained in the pores of the aged gel composite in the subsequent drying step by controlling the vapor pressure of the liquid. The DCCA slows down the rate of evaporation so that it does not exceed the rate of rearrangement of the necks among soda-silicate particles of the gel while the pore liquid is removed and the gel shrinks. As a result, the pores of the dried gel are smaller and more uniform in distribution, producing crack-free dried gel matrices having an enormous surface area in the range of 600 m$^2$/g to 1100 m$^2$/g. The DCCA is preferably selected from the group consisting of glycerol, formamide, oxalic acid and other acids having the formula $C_nH_{2(n-1)}O_{2n}$. These additives, as well as the general procedure for preparing sols from $SiO_2$ precursors with or without other precursors of $Al_2O_3$, $Li_2O$, $Na_2O$, $TiO_2$ and $B_2O_3$ are described in detail in the aforementioned copending applications, here incorporated by reference. This mixture was then dispersed using a sonicator for 15 minutes. The dispersed solution was mixed with another solution of water and drying control chemical additive (DCCA) (oxalic acid from about 0.05 to about 10 percent by weight of the TMS), to which tetramethoxysilane (TMS) was also added later. The total amounts of $SiO_2$ powders, additive, water and TMS in the final solution were precalculated. The solution was stirred continuously on a hot plate for 30 minutes. During this step, the solution was covered with polyethylene film, on top which some ice pieces were placed in order to keep the water content in the solution from evaporating. Finally, the solution was cast into a number of 30 cc-Teflon containers. Usually 28-30 casts were made from the solution. The casts were first aged at 60° C. for 12 hours, followed by another 12-hour aging at 80° C. in an air circulating oven. When the aging step is finished, the sample reaches a gel state and each cast sample was removed carefully from the Teflon container, and then wrapped with polyethylene film. The samples were dried in an oven where the temperature was set at 90±5° C. for about 6 days. When samples were dried at this temperature, the polyethylene films were removed. At this stage, the samples stayed monoliths and were very hard. The $SiO_2/SiO_2$ composite monoliths were finally dried in an air atmosphere at 150° C. for 24 hours before measurements were made.

Two different amounts of $SiO_2$ powders, 1 wt.% and 4 wt.%, were added to the solution of either 0.5 gm drying control chemical additive (DCCA) or 6 gm DCCA in order to produce $SiO_2/SiO_2$ composites. Samples with 10 wt.% $SiO_2$ powder and 6 gm DCCA were also produced.

The procedure described routinely produced $SiO_2/SiO_2$ composite monoliths without cracking. Samples remained without any cracks when heated up to 750° C. to be densified. The physical and mechanical properties of the samples were measured and the following are the results.

DENSITY

Figure 1:
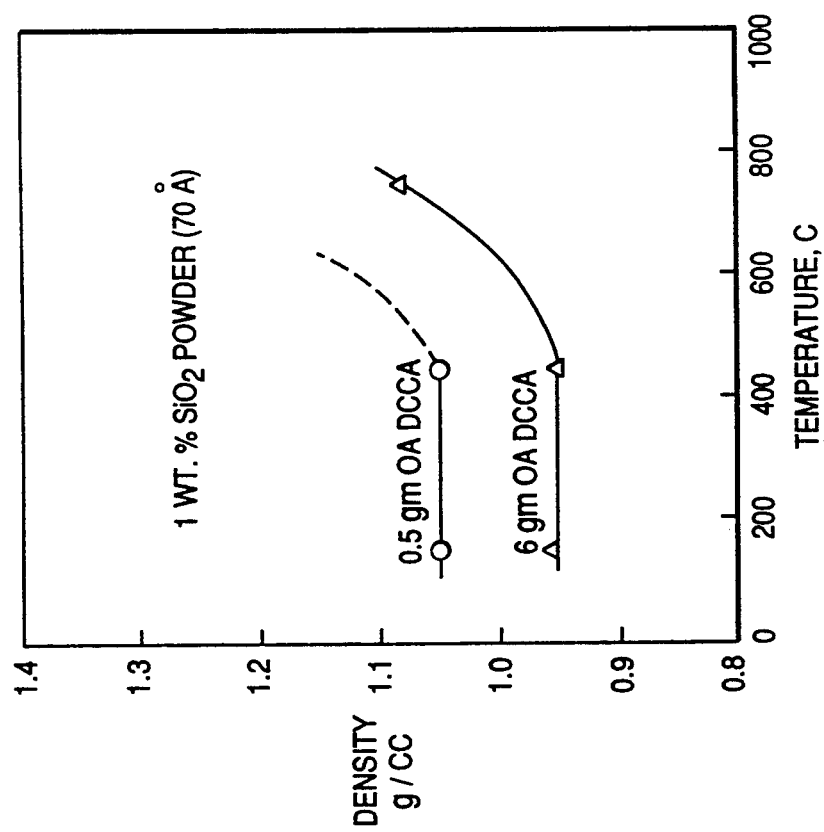

FIG. 1 shows the density variation with temperature for $SiO_2/SiO_2$ composites containing 1 wt.% $SiO_2$ powder (with a particle size of 70Å). The effect of the amount of DCCA (0.5 gm and 6 gm) on density of the composite is also seen. Density increases as applied temperature increases in both cases, where different amounts of DCCA were used. It can also be seen that the density of the composite with 0.5 gm DCCA is higher than that with 6 gm DCCA.

The experimental results for 4 wt.% $SiO_2$, same particle size, is shown in FIG. 2. It can be seen that the results are found to be similar to those of the 1 wt.% $SiO_2$ sample, e.g., the density of the composite with 0.5 gm DCCA is higher than that of the other composite with 6 gm DCCA. It should be also noted that the density below 450° C. does not change much in both cases. However, density increases sharply as applied temperature increases to 750° C. It is believed that density of the samples increases as the temperature further increases.

Figure 3:
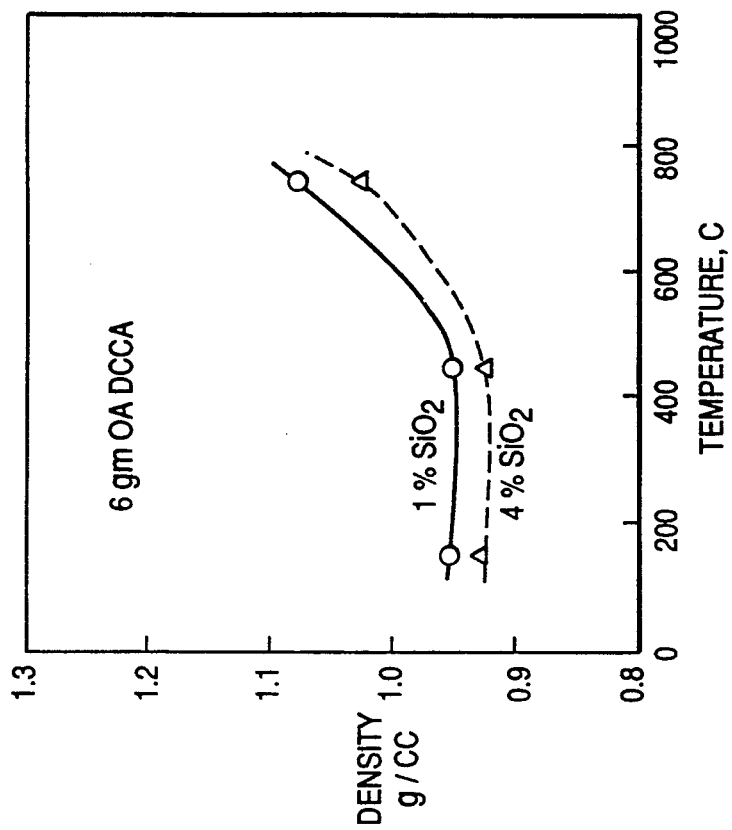
Figure 4:
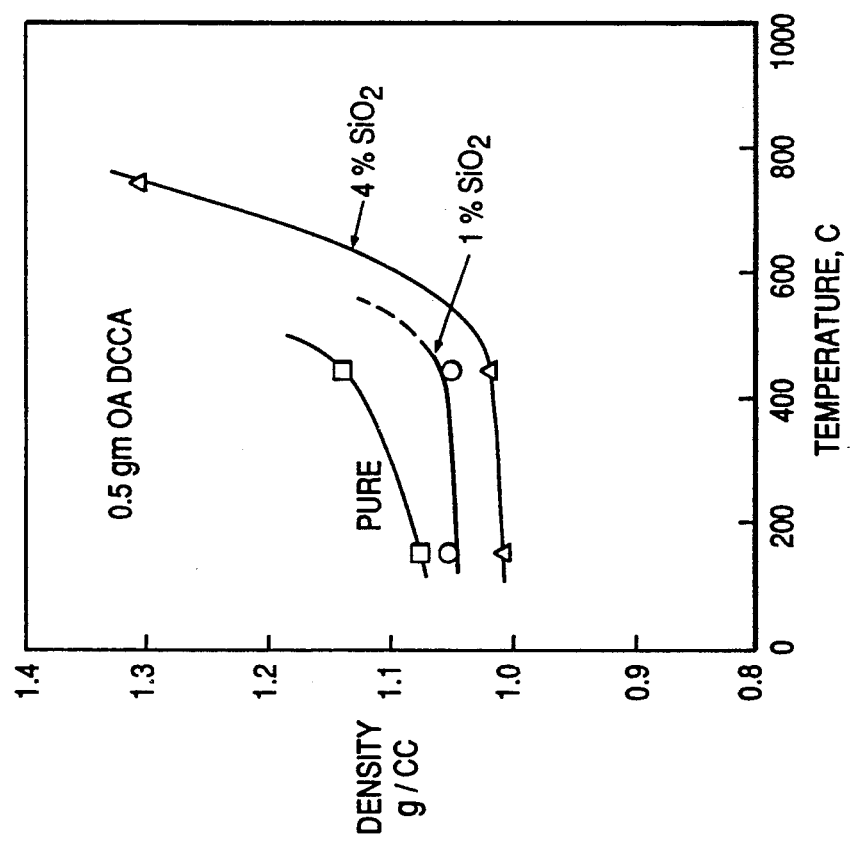

The effects of the amounts of $SiO_2$ powder on the density vs temperature relations are seen in FIGS. 3 and 4. Although a small effect is seen, it is clear that the 1 wt.% $SiO_2$ composite is denser than that of the 4 wt.% $SiO_2$ with both 0.5 gm DCCA and 6 gm DCCA samples. The lower density value for the composite with the larger amount of $SiO_2$ may be attributed to the lower bulk density of the powder compared with the density of the silica monoliths. The density of the powder supplied by the manufacturer was 0.0733 gm/cc.

SHRINKAGE

Shrinkage of gels is an important phenomenon in sol-gel processes. Consequently, it is valuable to determine whether shrinkage of the $SiO_2/SiO_2$ composites is less than that of $SiO_2$ monoliths by themselves. A radial shrinkage was determined by measuring the diameter change of the cylindrical samples. FIG. 5 shows the variation of the total radial shrinkage with temperature of the $SiO_2/SiO_2$ samples with 1 wt.% and 4 wt.% $SiO_2$ powders when produced using 0.5 gm DCCA $SiO_2$ gel. At all temperatures examined, it was found that samples with 4 wt.% $SiO_2$ powders when produced using 0.5 gm DCCA $SiO_2$ gel. At all temperatures examined, it was found that samples with 4 wt.% $SiO_2$ powder showed less shrinkage than those with smaller amounts of $SiO_2$ powder. In other words, the total shrinkage decreases with increasing amounts of $SiO_2$ powder. This indicates that $SiO_2$ powder can occupy the sites in the matrix, without contributing any shrinkage during sol-gel processes. It is believed that no contribution is due to the solid form of the $SiO_2$ powders. Therefore, the larger the amount of powder present in the matrix, the less the total shrinkage is observed. This is seen quantitatively in FIG. 6, where total radial shrinkage is plotted as a function of $SiO_2$ powders in two different samples of 0.5 gm OA and 6 gm OA DCCA. It can be clearly seen from the figure that the total shrinkage is a function of the amount of $SiO_2$ powder, and decreases with increasing powder concentration.

Figure 7:
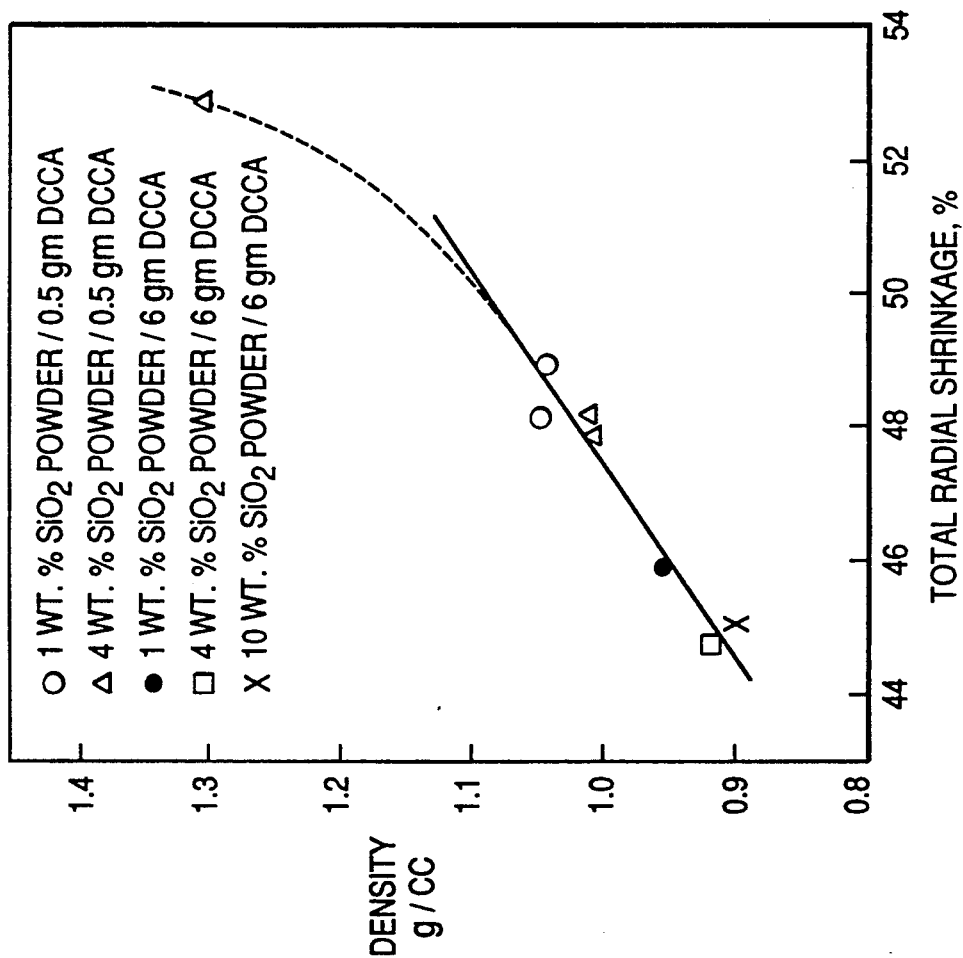

Since both total shrinkage and density of the samples are strong functions of temperature, it was attempted to find a relationship between the two properties in the $SiO_2/SiO_2$ composites. Data obtained from samples of different compositions are plotted in FIG. 7. It is found that density is a linear function of the total shrinkage up to 50%. About 50% of shrinkage, there is an abrupt change in slope, indicating that a different densification mechanism may be predominant as the materials become denser.

MECHANICAL PROPERTIES

Figure 8:
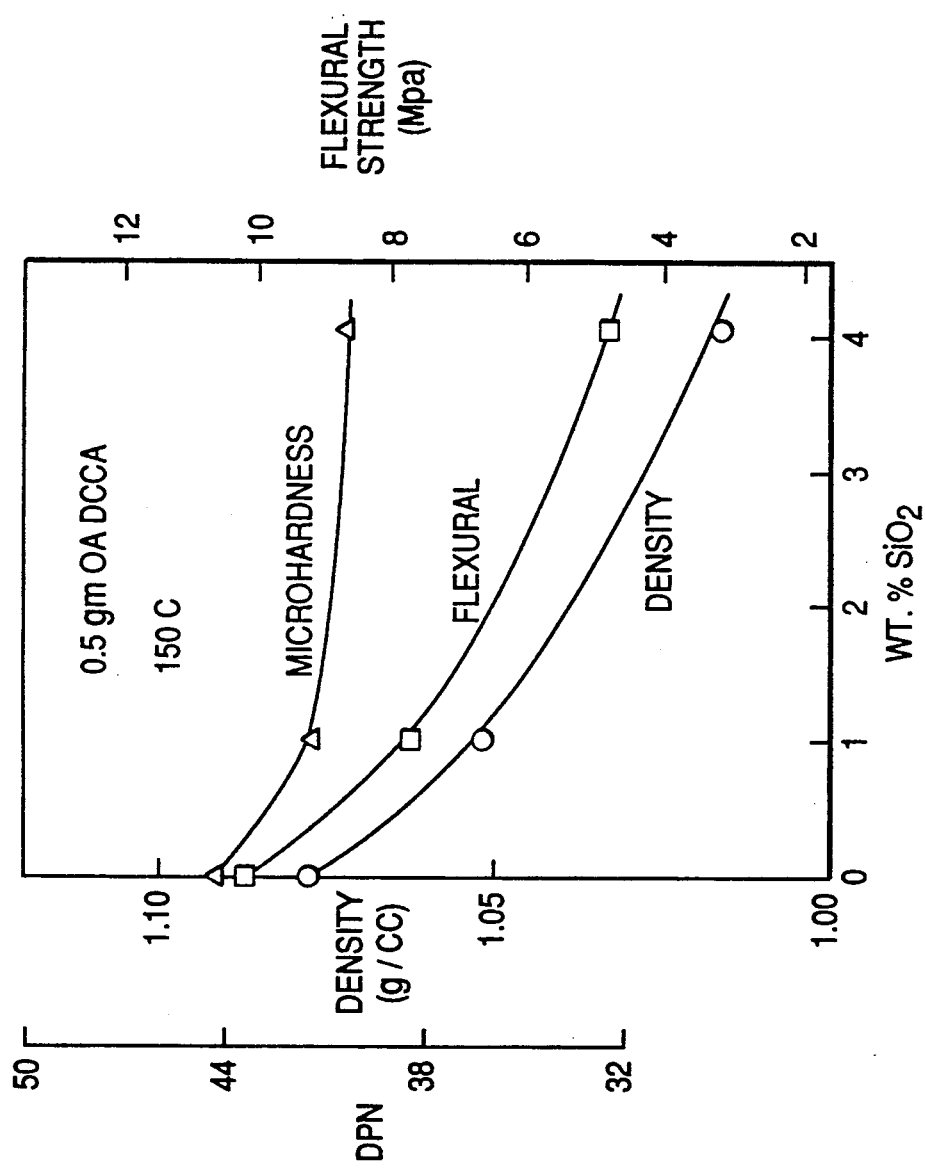

Microhardness and flexural strength of the dried (150° C.) composite samples prepared with 0.5 gm DCCA are plotted in FIG. 8 as a function of the amount of $SiO_2$ powder introduced. Density is also plotted in this figure. Although the microhardness does not change much, the mechanical properties seem to decrease as the amount of $SiO_2$ powder increases. This may be explained by:

1. Bonds between $SiO_2$ powders and matrix are not yet strong, or
2. $SiO_2$ powders are weak due to their low bulk density.

Figure 9:
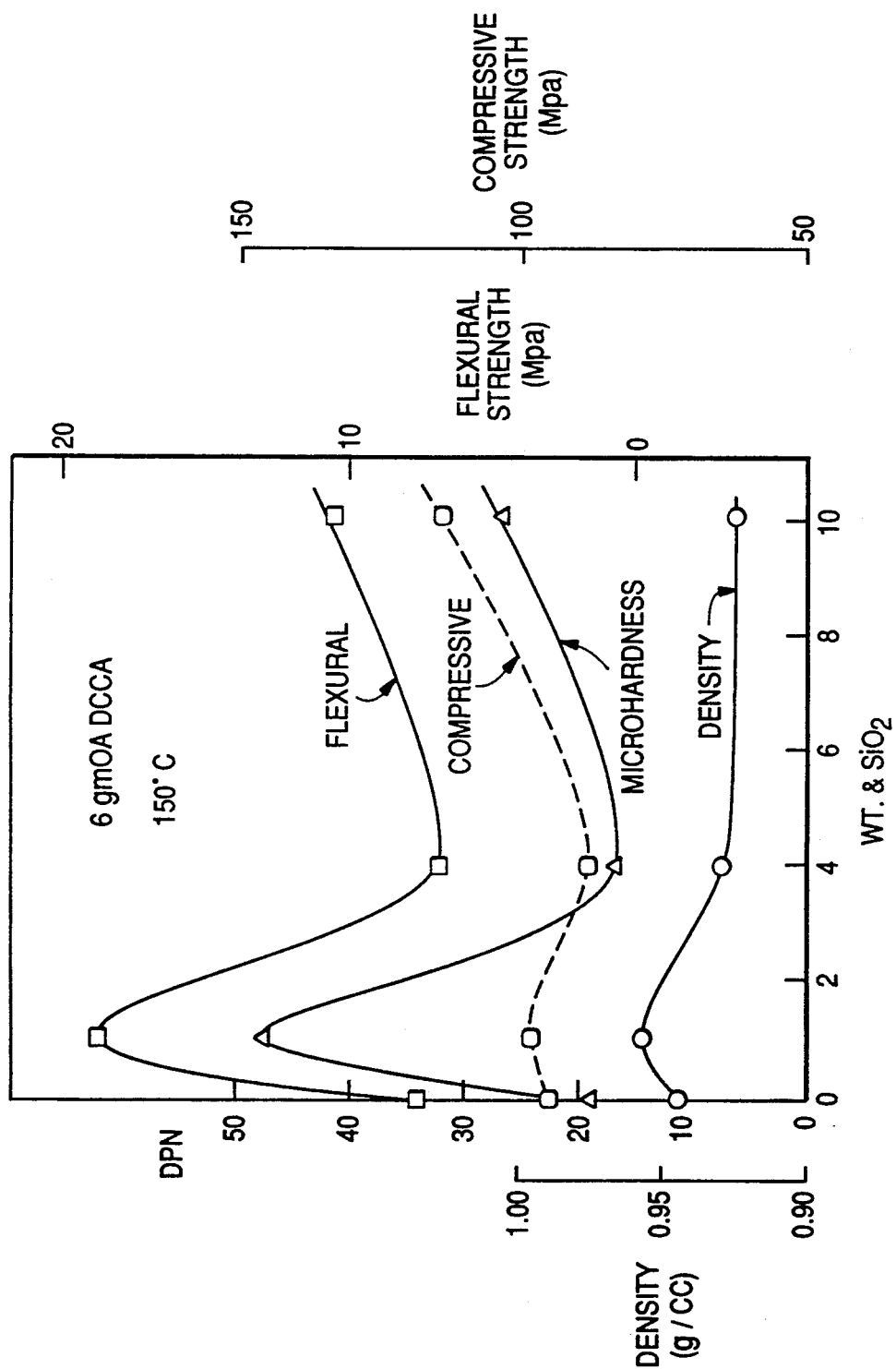

However, the mechanical properties of the dried (150° C.) composites made with 6 gm DCCA, plotted FIG. 9, are very much more interesting. In these samples, in contrast to the samples made with 0.5 gm DCCA, properties increase with small 1% additions of $SiO_2$ powder. This is followed with a decrease of properties with 4% addition of $SiO_2$ powder and further an increase with 10% addition of $SiO_2$ powder. There is almost a 250% increase in microhardness and a 200% increase in flexural strength with the 1% $SiO_2$ addition. This major improvement in properties occurs with only a minor increase in density. The $SiO_2/SiO_2$ composites are still less than 1.0 g/cc density. Thus, the strength-/density ratio is very large.

Both density and shrinkage of the $SiO_2/SiO_2$ composites decrease slightly with increasing amounts of $SiO_2$ powder. It is found that density and shrinkage of the $SiO_2/SiO_2$ composite depend upon not only the amount of $SiO_2$ powder, but also the amount of DCCA in the silica matrix.

Introducing silica powder in the 0.5 gm DCCA silica gel does not give a strengthening effect on the $SiO_2/SiO_2$ composites. It rather decreases the mechanical properties. It is found, however, that a small amount (1wt.%) of $SiO_2$ powder increases the mechanical properties dramatically in the 6 gm DCCA samples.

There is a linear relationship between the total radial shrinkage and density when the shrinkage is below approximately 50%, where density has a value of about 1.1 gm/cc. It is believed that, above this value, a different densification mechanism may be operating.

The following is a further specific example of the procedure or method of the present invention. In this example, the following starting materials were used, tetramethoxysilane (TMS) 150 cc; oxalic acid 6 gm; $H_2O$ (distilled deionized) 300 cc; $SiO_2$ powder 0.592 gm;

The method used was as follows: A solution with $SiO_2$ powders dispersed was prepared by first pouring 75 cc of water into a clean polypropylene bottle. Next, 1.5 gm oxalic acid were weighed as were 0.592 gm Cab-O-Sila powder. Both were put into the polypropylene bottle and the solution dispersed using a Sonicator for 15 minutes.

Separately a solution mixture of water and oxalic acid were prepared by first pouring 225 cc $H_2O$ into a 800 cc clean beaker. Next, 4.5 gm oxalic acid were weighed and put into the beaker, and the beaker placed on a hot-stirring plate. The solution was stirred for 10 minutes using a magnetic bar stirrer coated with PTFE.

The final solution was prepared by pouring the solution of $SiO_2$ powders dispersed in water and oxalic acid into the solution of water and oxalic acid. The combined solutions were stirred for 5 minutes to get a homogeneous solution. 150 cc TMS were added to the homogeneous solution, and the temperature was increased gradually over five minutes from 25° C. to 85° C. by turning the temperature control knob on the hot-stirring plate to the maximum scale. The processing time was counted from the time TMS was added to the solution. The solution was continuously stirred vigorously. Immediately after adding TMS into the solution, the beaker was covered with a three-layer polyethylene film, on top of which some pieces of ice were placed in order to condense water vapor and return it to the solution. Stirring and heating were continued for 40 minutes.

To casting the solution in the beaker, a clean clear styrene acrylonitrile (SAN) mold with a capacity of 500 ml was prepared. The solution was cast and a lid placed on the beaker (container). Every edge of the lid was taped (Teflon tape) to make sure that the container was completely closed.

Next, the container, taped shut and sealed, was placed into an oven and the solution aged continuously at 60° C. for 10 hours. The temperature was increased to 80° C. and aging was continued for 22 hours additional whereupon a gel resulted.

The wet gel was removed from the container with good care being taken not to expose the wet gel to the air as a direct exposure to the air may cause a crack. The wet gel was immersed into water immediately after the container was opened. A large glass container filled with water had been prepared for this purpose. The gel was transferred into the glass container carefully, and the glass container closed with another glass container of a smaller size. This whole unit was put into a drying oven at a preprogrammed temperature and time schedule ranging from 80° C. to 150° C. The gel was heated with rates of 2° C./hr and 0.667° C./hr in the temperature ranges of 80°-110° C. and 110°-150° C., respectively. Then the gel was held at 150° C. for 25 hours, followed by cooling to 80° C. in 5 hours.

The result was a monolithic gel including $SiO_2$ powder. When casting, it is preferred to cast in a mold with near net shape, that is identical in shape except for scale. When the gel shrinks during drying and densifying, it will retain the original shape and the surface finish of the mold In other specific examples, composite gels were developed of the following contents.

a. 95% by weight $SiO_2$ (matrix) and 5% by weight eucryptite crystals (second phase less than 1 micron powder).

b. 80% by weight $SiO_2$ (matrix) and 20% by weight aluminum titanate (second phase less than 1 micron powder).

c. 70 mole of $LiO_2$; 6 mole% $TiO_2$; 19 mole% $Al_2O_3$; 5 mole of $Li_2O$.

The above thermal expansion coefficients of $0 \times 10^{-7}$ (°C.$^{-1}$) over a large temperature range, at least 0° C. to 1000° C.

Having now fully described the present invention, it will be apparent to one of ordinary skill in the art that changes and modifications are possible which do not depart from the spirit and scope of the invention as set forth herein.

What is claimed is:

1. A method of making a $SiO_2$ gel/oxide powder composite comprising the steps of:
   (1) preparing a sol containing $SiO_2$ with oxide powder dispersed therein in the presence of a drying control chemical additive,
   (2) gelling the sol to produce a monolithic $SiO_2$ gel matrix having homogeneously distributed therein the oxide powder, and
   (3) drying the monolithic $SiO_2$ gel/oxide powder composite, wherein the dried gel matrix of the composite is crack-free and has a surface area in the range of 600 m$^2$/g to 1100 m$^2$/g.

2. The method of claim 1 including the step of densifying the $SiO_2$ gel/oxide powder composite.

3. The method of claim 1 wherein the sol also contains a constituent selected from the group consisting of $Al_2O_3$, $Li_2O$, $Na_2O$, $TiO_2$, $B_2O_3$ and mixtures thereof.

4. The method of claim 1 wherein the oxide powder is selected from the group consisting of $SiO_2$, $Al_2O_3$, $ZrO_2$, $TiO_2$, $Li_2O$-$TiO_2$, $Li_2O$-$Al_2O_3$-$TiO_2$, spodumene crystals, eucryptite crystals, aluminum titanate, 68 $SiO_2$-

21.4 Al$_2$O$_3$-5.7 TiO$_2$-3.8 Li$_2$O (mole %) and mixtures thereof.

5. The method of 1 wherein the drying control chemical additive is oxalic acid.

6. The method of claim 1 wherein the drying control chemical additive is present from about 0.1 to about 10 weight percent of the matrix producing constituent(s) in the sol.

7. The method of claim 1 wherein the drying control chemical additive is selected from the group consisting of glycerol, formamide, oxalic acid and acids having the formula C$_n$H$_{2(n-1)}$O$_{2n}$.

8. The method of claim 1 wherein the oxide powder is of a size from about 10 microns to about 0.001 micron.

9. The method of claim 8 wherein the oxide powder is of a size less than one micron.

10. A monolithic, gel-derived crack-free composite comprising a SiO$_2$-containing gel matrix having homogeneously distributed therein an oxide powder made by the method of claim 1.

11. A composite as in claim 10 wherein the sol also contains a constituent selected from the group consisting of Al$_2$O$_3$, Li$_2$O, Na$_2$O, TiO$_2$, B$_2$O$_3$ and mixtures thereof.

12. A composite as in claim 10 wherein the oxide powder is selected from the group consisting of SiO$_2$, Al$_2$O$_3$, ZrO$_2$, TiO$_2$, Li$_2$O-TiO$_2$, Li$_2$O-Al$_2$O$_3$-TiO$_2$, spodumene crystals, eucryptite crystals, aluminum titanate, 68 SiO$_2$-21.4 Al$_2$O$_3$-5.7 TiO$_2$-3.8 Li$_2$O (mole %) and mixtures thereof.

13. A composite as in claim 10 wherein the matrix is SiO$_2$ and constitutes about 95 weight percent, and the oxide powder constitutes about 5 weight percent and is of a size less than 1 micron and is composed of spodumene crystals.

14. A composite as in claim 10 wherein the matrix is SiO$_2$ and constitutes about 80 weight percent and the oxide powder constitutes about 20 weight percent and is of a size less than 1 micron and is composed of aluminum titanate.

15. A composite as in claim 10 wherein the oxide powder is of a size less than 10 microns.

16. A composite as in claim 15 wherein the oxide powder is of a size less than 1 microns.

17. The composite of claim 10 wherein the drying control chemical additive is selected from the group consisting of glycerol, formamide, oxalic acid and acids having the formula C$_n$H$_{2(n-1)}$O$_{2n}$.

18. The composite of claim 17 wherein the drying control chemical additive is oxalic acid.

19. A monolithic, gel-derived crack-free composite comprising a SiO$_2$-containing gel matrix having homogeneously distributed therein an oxide powder made by a method comprising the steps of:
  (1) preparing a sol containing SiO$_2$ with oxide powder dispersed therein in the presence of a drying control chemical additive;
  (2) gelling the sol to produce a monolithic SiO$_2$ gel matrix having homogeneously distributed therein the oxide powder; and
  (3) drying the monolithic SiO$_2$ gel/oxide powder composite,
wherein the composite has the composition of about 70 mole percent SiO$_2$, about 6 mole percent TiO$_2$, about 19 mole percent Al$_2$O$_3$ and about 5 mole percent Li$_2$O.

* * * * *